United States Patent
Cornils et al.

[11] Patent Number: 5,806,257
[45] Date of Patent: Sep. 15, 1998

[54] VEHICLE WINDOW PANE PREPARED FOR ADHESIVE FASTENING

[75] Inventors: Gerd Cornils, Merzenich-Golzheim; Rolf Kötte, Alsdorf-Begau; Dieter Kleyer, Würselen, all of Germany

[73] Assignee: Saint Gobain Vitrage, Courbevoie, France

[21] Appl. No.: 729,708

[22] Filed: Oct. 7, 1996

[30] Foreign Application Priority Data

Oct. 7, 1996 [DE] Germany .................. 195 37 436.3

[51] Int. Cl.⁶ .................. B60J 1/00; E06B 3/54
[52] U.S. Cl. .................. 52/208; 52/100; 296/96.21; 296/146.15
[58] Field of Search .................. 52/208, 204, 591, 52/100; 296/146.15, 201, 93, 96.21

[56] References Cited

U.S. PATENT DOCUMENTS

| | | |
|---|---|---|
| 3,779,794 | 12/1973 | DeSantis . |
| 4,551,372 | 11/1985 | Kunert . |
| 4,571,278 | 2/1986 | Kunert . |
| 4,581,276 | 4/1986 | Kunert et al. .................. 428/157 |
| 4,662,113 | 5/1987 | Weaver . |
| 4,681,794 | 7/1987 | Kunert et al. .................. 296/96.21 X |
| 4,712,826 | 12/1987 | Omori . |
| 4,719,736 | 1/1988 | Aho et al. .................. 296/201 X |
| 4,762,481 | 8/1988 | Weaver . |
| 4,834,931 | 5/1989 | Weaver . |
| 4,910,071 | 3/1990 | Kunert .................. 296/96.21 X |
| 4,938,521 | 7/1990 | Kunert . |
| 5,062,248 | 11/1991 | Kunert . |
| 5,069,012 | 12/1991 | Riederer . |
| 5,085,021 | 2/1992 | Kunert . |
| 5,391,416 | 2/1995 | Kunert . |
| 5,620,794 | 4/1997 | Burkart et al. .................. 52/208 X |

FOREIGN PATENT DOCUMENTS

| | | |
|---|---|---|
| 0 121 480 A1 | 10/1984 | European Pat. Off. . |
| 36 12 923 A1 | 10/1987 | Germany . |
| 0 494 824 A1 | 6/1990 | Germany . |
| G 9003934.3 | 6/1990 | Germany . |
| 703873 | 2/1954 | United Kingdom . |

*Primary Examiner*—Robert Canfield
*Attorney, Agent, or Firm*—Pennie & Edmonds LLP

[57] ABSTRACT

An automobile glass pane, intended for adhesive fastening, is provided with an extruded-on profile frame, which has a U-shaped profile section (3) with a channel-like depression, the side ribs of which are provided with anchoring projections. The adhesive composition (16) is introduced into the channel-like depression. The materials of the profile frame and of the adhesive composition do not enter into an adhesive bond with one another, instead the connection between the hardened adhesive composition (16) and the profile section (3) is provided by the mechanical interlocking alone. To be able in an emergency to press out the glass pane from inside easily and quickly, at the bottom of the channel-like depression there is laid a flexible cord (10), of which at least any intersection is led out from the frame inwards. By pulling out this cord (10), the release of the mechanical interlocking between the hardened bead of adhesive and the frame profile is made easier.

9 Claims, 3 Drawing Sheets

VEHICLE WINDOW PANE PREPARED FOR ADHESIVE FASTENING

BACKGROUND OF THE INVENTION

The invention relates to a glass pane intended for adhesive fastening, with a profile frame which is made of an elastomer and has on the side opposite the adhesive flange of the window opening a cross-sectionally channel-shaped profile section, provided with undercuts and/or anchoring projections, for receiving the adhesive composition establishing the adhesive connection with respect to the adhesive flange of the window opening, the connection of which with the profile frame takes place without adhesive bonding by the mechanical interlocking of the hardened adhesive composition with the undercuts and/or anchoring projections of the channel-shaped profile section.

A glass pane of this type for use in a motor vehicle is known from DE 4301026 A1. Such a glass pane has the advantage that, on the one hand, its assembly in the motor vehicle is performed by the usual, tried-and-tested adhesive methods, but that, on the other hand, in case of need it can be released again from the window frame relatively quickly and easily. This is because, since the adhesive composition and the profile frame do not enter into an adhesive bond and the profile frame consists of an elastically compliant polymer, the glass pane can be removed by pressing out after hardening of the adhesive, the side webs of the channel-shaped profile section yielding and detaching themselves from the hardened adhesive composition.

However, in the case of motor vehicles, the strength of the connection between the glass panes and the window frame of the body is subject to certain minimum requirements. For example, the connection must be strong enough that, in rear-end collisions, the vehicle occupants are not thrown out of the vehicle through the front window opening even at relatively high speeds. For this reason, the windscreens must be laminated panes of glass of high penetration resistance, and their connection with the window frame must likewise not be released. This means for automobile window panes of the generic type that the required strength of the connection must be achieved by corresponding adjustment of the hardness of the elastomer and/or by corresponding geometrical design of the profile frame, to be specific of the cross-section of the channel-shaped profile section, which is possible without difficulties. On the other hand, however, as a result, the deliberate releasing of the glass pane in case of need is made more difficult to a greater or lesser extent. Although removal of the pane in the workshop can be carried out without any problems using suitable tools, the connection with the window frame is so solid that it is not possible for an occupant of the vehicle to press out the window pane from the inside in an emergency, in order to free himself from the vehicle, for example after an accident.

SUMMARY OF THE INVENTION

The invention is based on the object of developing a glass pane of the generic type such that, without significantly impairing the strength of the connection, it can be released from its connection from inside the vehicle in case of need, for example in particular after an accident, for the purpose of exposing an emergency escape opening, without excessive forces having to be expended.

According to a first embodiment, the object on which the invention is based is achieved by there being arranged on the bottom of the channel-like depression, at least over part of the profile frame, a flexible cord, of which at least an end section is led out and can be gripped on the side facing the interior compartment, and with the aid of which the mechanical interlocking between the hardened bead of adhesive and the inner web of the channel-shaped profile section can be released.

Although the arrangement of a release cord within or directly next to a bead of adhesive is known in principle, for example from EP 0121480 A1, in the case of the known solutions the release cord always serves the purpose of severing the bead of adhesive itself. Considerable forces have to be exerted for this purpose, special devices generally being required for this. Releasing the glass pane with the aid of the release cord by a vehicle occupant in an emergency is not possible in the case of the known adhesive connections, so they cannot perform the function of an emergency escape window.

In contrast to the known forms of glazing, in the case of the glass pane according to the invention the flexible cord does not serve the purpose of severing the adhesive connection, but merely has the purpose of assisting specifically the operation of releasing the profile frame from the hardened bead of adhesive, in that the cord between the hardened bead of adhesive and the inner web of the channel-shaped profile section is drawn out continuously. Since the cord is not embedded in the adhesive composition, no great forces are required for releasing the cord from the adjacent adhesive composition. The forces for releasing the cord from the adhesive composition can be further reduced by providing the cord with a suitable adhesion reducing agent, which prevents the cord adhering to the adhesive composition.

According to another embodiment, the object on which the invention is based is achieved by reducing the mechanical anchorage by the undercuts and/or anchoring projections in a locally limited section of the profile frame in such a way that the beginning of the operation of releasing the glass pane is possible in this section without the assistance of tools.

In the case of this embodiment, the strength of the mechanical interlocking is specifically weakened by changing the geometrical shape of the anchoring projections and/or of the undercuts in a locally limited region, preferably in a corner region. At this location, the release of the profile frame from the hardened bead of adhesive can be achieved relatively easily and quickly by applying pressure to the border region of the glass pane from the inside. If the releasing operation is initiated in this way at the said location, it can be continued relatively easily also in the adjoining regions with increased mechanical interlocking, so complete releasing of the glass pane alone by the force applied by an occupant of the vehicle is also possible in the case of this embodiment.

If this embodiment according to the invention is used in the case of a windscreen, the weakening of the mechanical interlocking is preferably carried out in the lower corner of the windscreen alongside the driver's seat. In this way, the effect is achieved that, in spite of the local weakening of the connection, the windscreen stays in the frame in a rear-end collision, because the kinetic energy of the driver is intercepted by the airbag and does not come to bear on the windscreen.

According to a preferred embodiment of the invention, the profile frame has no anchoring projections and/or undercuts over a length of 10 to 30 cm in each case from the corner of the pane.

BRIEF DESCRIPTION OF THE DRAWINGS

Further details and advantages of the invention emerge from the subclaims and from the following description of various embodiments with reference to the drawings, in which:

DETAILED DESCRIPTION OF THE INVENTION

In the following description, the invention is described with reference to exemplary embodiments of a windscreen for motor vehicles. It goes without saying that the invention can also be used for all other glass panes of a motor vehicle, provided that the fastening of the glass panes takes place in the sane way in the frame of the vehicle body. The invention is also not restricted to the application in the case of motor vehicles, but can also be used in other vehicles, as well as for glazing in the building sector, if the possibility of an emergency escape opening is to be provided.

Figure 1:
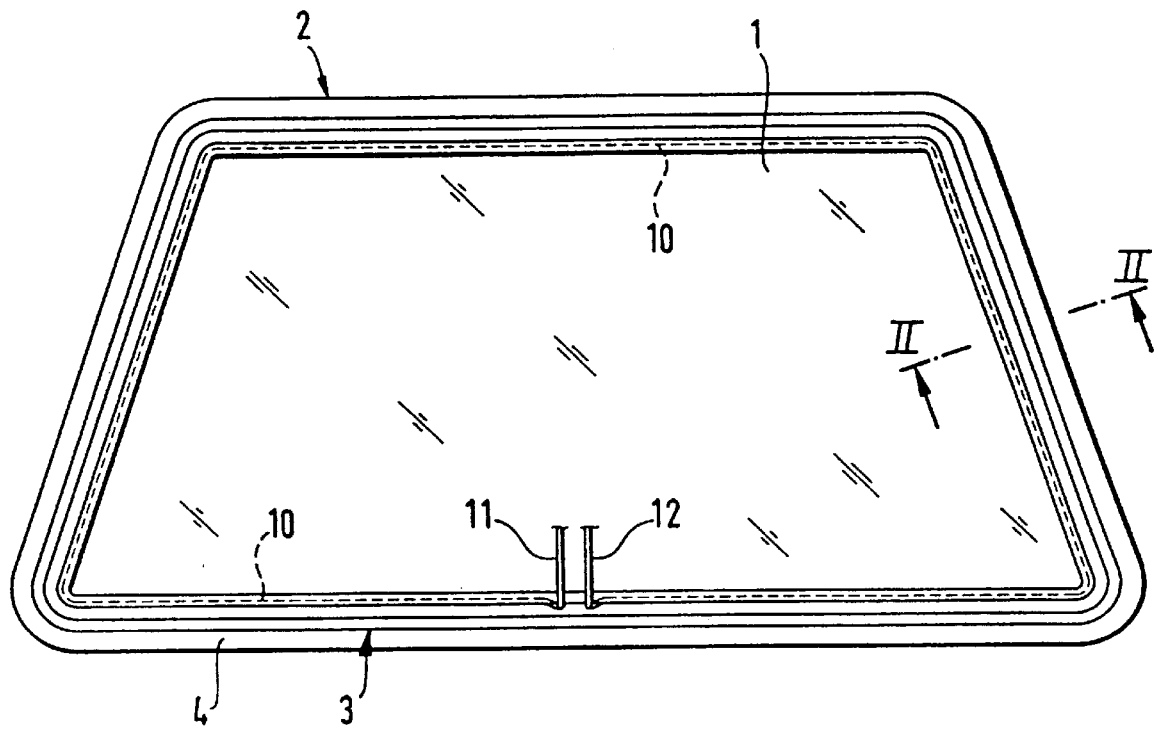
FIG. 1 shows a windscreen with a profile frame and a cord laid in the profile frame, in an overall view.
Figure 2:
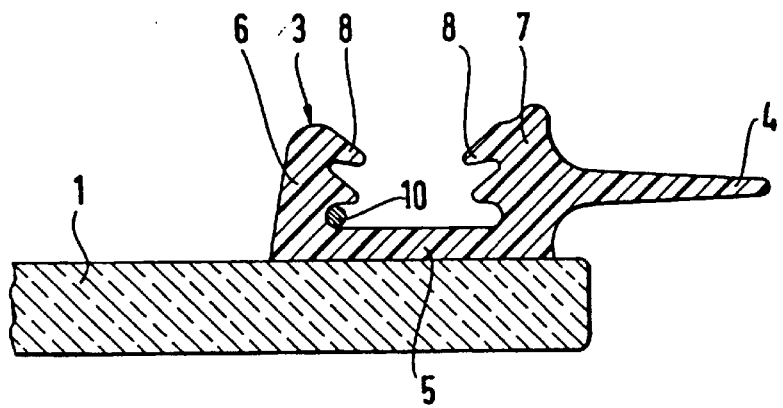
FIG. 2 shows a section along the line II—II in FIG. 1 in an enlarged representation.
Figure 3:
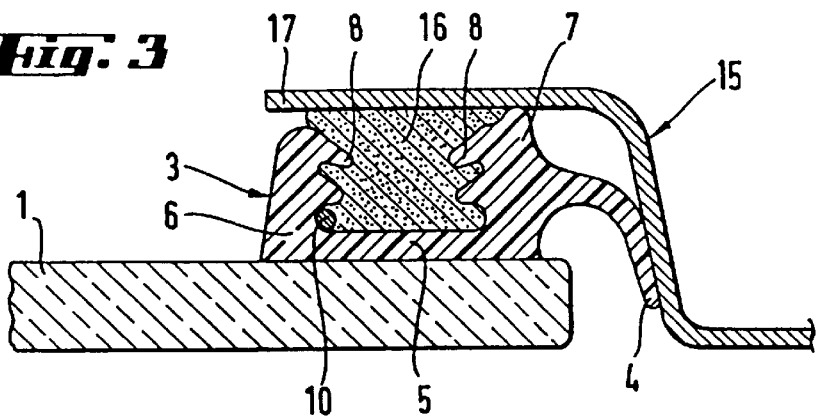
FIG. 3 shows the windscreen represented in FIG. 1 in the fitted state, as a section in the border region in an enlarged representation.
Figure 4:
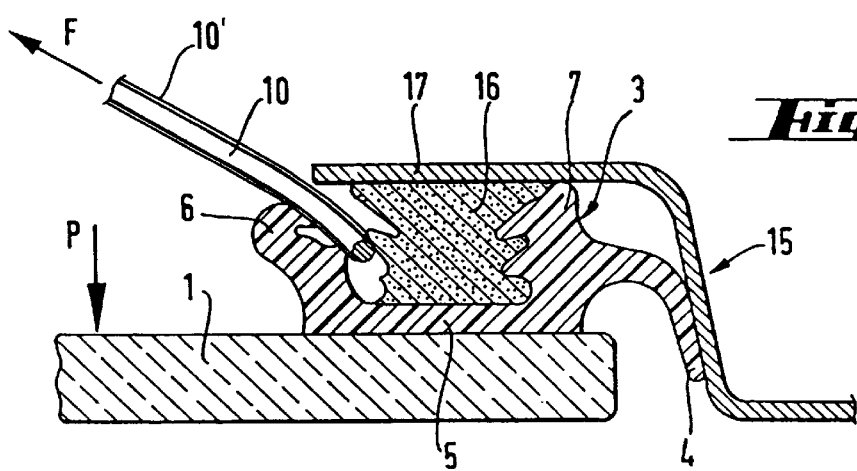
FIG. 4 shows the windscreen represented in FIG. 3, in the phase of release with the aid of the cord.

As FIG. 1 shows, the glass pane 1 is provided along its entire pane periphery with a profile frame 2 made of an elastomer. It is preferably a profile pane which has been extruded onto the surface of the glass pane with the aid of a process known, for example, from DE 4301026 A1. In the case of the windscreen, the glass pane 1 itself consists of laminated glass. However, it goes without saying that it may also consist of monolithic glass, expediently thermally toughened glass, so-called single-layer safety glass.

As can be seen in particular from FIGS. 2 to 5, the profile frame 2 has a substantially U-shaped profile section 3 and a lip 4 extending outwards beyond the border of the window pane. The U-shaped profile section 3 is composed of the bottom section 5, the inner side rib 6 and the outer side rib 7, which form a channel-like depression. The channel-like depression widens towards the bottom section 5, and the side ribs 6 and 7 are respectively provided on their inner side with undercut, whereby anchoring projections 8 are formed. Arranged in the channel-like depression along the line formed by the bottom part 5 and the inner side rib 6 is a flexible cord 10, to be precise along the entire profile frame. The two end sections 11, 12 of the cord 10 are led out from the channel-like depression of the profile section 3 at a suitable location, preferably at the bottom in the centre of the profile frame 2. Until assembly of the glass pane, the cord ends 11, 12 are fastened on the glass pane in a suitable way and, after assembly of the glass pane, are brought into their final position, in which they can be easily gripped in case of need.

The fitting of the glass pane into the window frame 15 takes place by a strand of adhesive 16 being laid into the channel-like depression of the profile section 3 with the aid of a suitable injection nozzle and the glass pane thus prepared being inserted into the window frame under the application of pressure. As this occurs, the adhesive composition 16 completely fills the channel-like cavity and adhesively bonds with the adhesive flange 17 of the window frame. The adhesive composition 16 does not enter into an adhesive bond with the profile section 3, nor with the cord 10. Thus, the cord 10 is held in the channel solely by mechanical interlocking with the channel and the adhesive composition. As previously stated, the forces for releasing the cord from the adhesive composition can be further reduced by providing the cord with a suitable adhesion reducing agent such as shown at 10' in FIG. 4.

Figure 5:
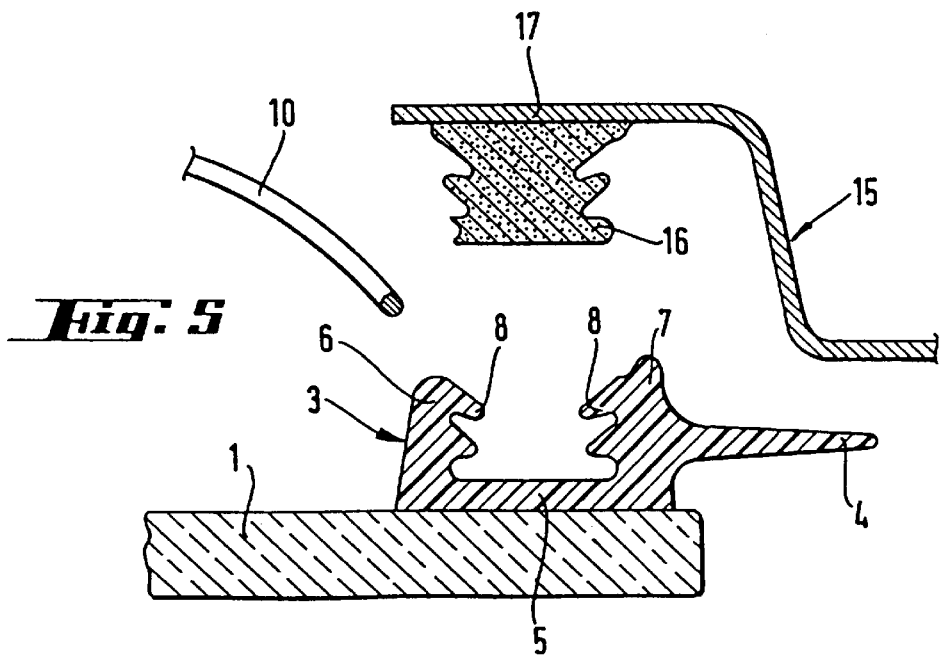
FIG. 5 shows the windscreen represented in FIG. 3, at the end of the releasing operation.

If, in an emergency, the glass pane is to be knocked out, the cord end 11 is gripped with the hand and the cord 10 is drawn out from the profile frame 3 by pulling in the direction of the arrow F, while at the same time the glass pane 1 is pressed out from the frame 15 in the direction of the arrow P. After removal of the glass pane 1 carried out in this way, the glass pane is completely released from the window frame 15, as it is shown in FIG. 5. If, as is generally the case with toughened single-layer safety glass panes, the glass pane 1 is not broken during this removal, the glass pane provided with the profile frame 2 can be fitted once again into the window frame. For this purpose, the previously hardened adhesive strand 16 is removed from the adhesive flange 17, and the channel of the profile section 3 is filled again with new adhesive composition.

Figure 6:
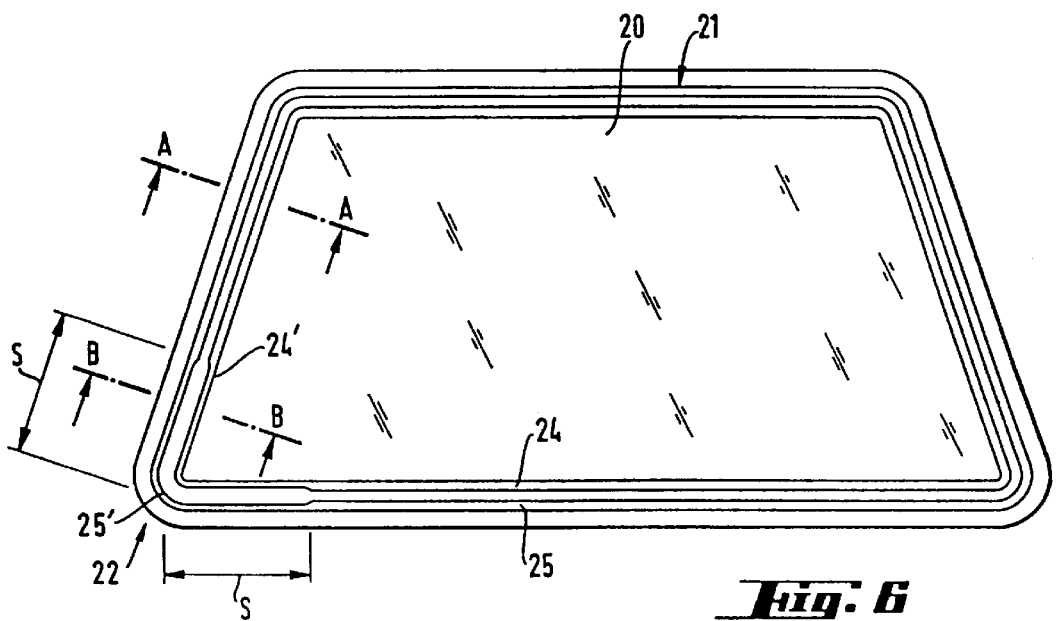
FIG. 6 shows a windscreen with a profile frame of regionally differing cross-section, in an overall view.
Figure 7A:
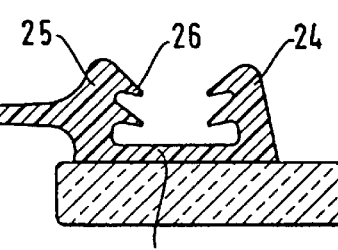
FIG. 7A shows a section along the line A—A of FIG. 6 in the case of a first embodiment of the profile cross-section.
Figure 7B:
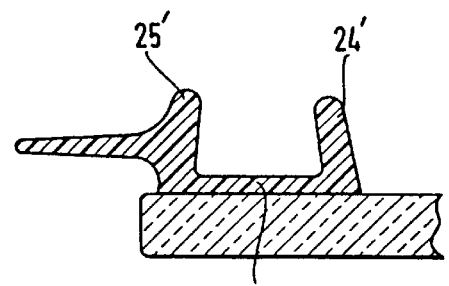
FIG. 7B shows a section along the line B—B of FIG. 6 in the case of the first embodiment of the profile cross-section.

The solutions represented in FIGS. 6 to 8 are based on the principle that the glass pane 20 is provided with a profile frame 21 which, on account of its cross-sectional design, can be released from the hardened bead of adhesive in the corner region 22 with relatively little expenditure of force, while it otherwise has a relatively solid connection with respect to the adhesive flange of the window frame as a result of strong intermeshing between the profile frame and the hardened bead of adhesive. The distance S with little intermeshing should be about 20 to 30 cm in both directions respectively.

In principle, different variants are possible for the cross-sectional design of the profile frame. For example, FIG. 7A shows a cross-sectional shape such as is known and usual for glass panes of the generic type. The profile frame has approximately the same cross-section as the profile frame represented in FIGS. 2 to 5 and has a bottom section 23 and also two side ribs 24 and 25, which are provided on the inner side with anchoring projections 26. In the corner region 22, however, the side ribs 24' and 25' have no anchoring projections, but have smooth bounding walls on the inner side as well. As a consequence, in this corner region 22 the forces necessary for releasing the glass pane are significantly less than in the region of the remaining frame.

Figure 8A:
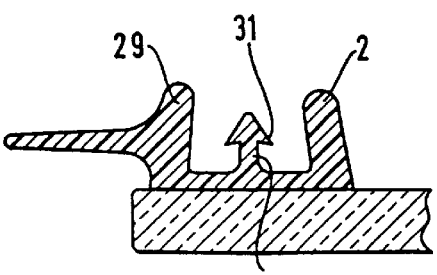
FIG. 8A shows a section along the line A—A of FIG. 6 in the case of a second embodiment of the profile cross-section and FIG. 8B shows a section along the line B—B of FIG. 6 in the case of the second embodiment of the profile cross-section.
Figure 8B:
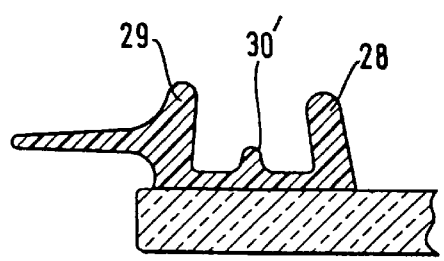

In the case of the embodiment of the profile frame represented in FIGS. 8A and 8B, the undercuts required for the intermeshing are not provided on the inner side of the side ribs 28 and 29, but are located on an additional central rib 30. This central rib 30 has at the upper end lateral projections 31, which perform this anchoring function. In the corner region 22, on the other hand, these anchoring projections 31 are not present on the central rib 30, as is revealed by FIG. 8B, which shows a section along the line B—B.

The profile frames represented in FIGS. 6 to 8 are also preferably produced by extruding a suitable polymer onto the glass pane. The changing of the cross-section in the corner region 22 can in this case be carried out during the extrusion operation in a relatively simple way by using an extrusion die of which the die cross-section can be changed in the desired way during the extrusion operation over the distance S by a slide. An extrusion die suitable for this purpose is, for example, the subject of DE 4031236 B1 and corresponding U.S. Pat. No. 5,273,704.

What is claimed is:

1. In a glass pane for adhesive fastening to a flange of a window opening, the pane having an elastomer profile frame extending around the periphery of the pane and having a channel shaped profile section for facing the flange and having inner and outer ribs to define a channel with an anchoring surface defined by at least one of undercuts and anchoring projections on the anchoring surface, the channel containing an adhesive composition for establishing an adhesive bond with respect to the flange of the window opening, the connection of the adhesive composition with the profile section being solely by mechanical interlocking of the adhesive composition with the anchoring surface of the channel shaped profile section, the improvement wherein a flexible cord (10) is arranged on the bottom of the channel of the profile section (3), said cord (10) extending at least over part of the profile frame (2) and having opposite end sections (11,12) with at least one end section (11,12) extending out of said channel to be gripped and pulled along the channel to release the mechanical interlocking between the adhesive composition (16) and at least one rib (6,7) of the channel shaped profile section (3).

2. Glass pane according to claim 1, wherein the flexible cord (10) is arranged at the base of the inner rib (6) of the channel shaped profile section (3).

3. Glass pane according to claim 1 or 2, wherein the flexible cord (10) is arranged along with the entire periphery of the window pane.

4. Glass pane according to claim 3, wherein both end sections (11,12) of the flexible cord extend out from the profile frame (2).

5. Glass pane according to claim 1 wherein the flexible cord (10) includes a coating at least reducing adhesion with respect to the adhesive composition (16) and the cord.

6. Glass pane according to claim 1, wherein the flexible cord (10) is held in said channel of the profile section (3) solely by mechanical interlocking with said channel and said adhesive composition.

7. In a glass pane for adhesive fastening to a flange of a window opening, the pane having an elastomer profile frame extending around the periphery of the pane and having a channel shaped profile section for facing the flange and having inner and outer ribs defining a channel with an anchoring surface defined by at least one of undercuts and anchoring projections on the anchoring surface, the channel containing an adhesive composition for establishing an adhesive bond with respect to the flange of the window opening, the connection of the adhesive composition with the profile section being solely by mechanical interlocking of the adhesive composition with the anchoring surface of the channel shaped profile section, the improvement wherein the at least one of undercuts and projections providing the mechanical interlocking of the adhesive composition with the anchoring surface of the channel of the profile section (26) are reduced in a locally limited region (22) of the profile section (21) relative to the at least one of undercuts and projections providing the mechanical interlocking along other regions of the profile section (21) in such a way that beginning of a releasing the glass pane with the profile section from the adhesive composition is possible in said locally limited region (22) without the assistance of tools.

8. Glass pane according to claim 7, wherein the locally limited region (22) of the profile section (21) is provided with reduced mechanical interlocking in the case of a windscreen of a vehicle in a lower corner region which will be adjacent the vehicle driver position when the windscreen is installed in the vehicle.

9. Glass pane according to claim 7 or 8, wherein the region (22) with reduced mechanical interlocking has a longitudinal extent of 20 to 60 cm along said profile section (21).

* * * * *

UNITED STATES PATENT AND TRADEMARK OFFICE
CERTIFICATE OF CORRECTION

PATENT NO.   :   5,806,257

DATED        :   September 15, 1998

INVENTOR(S)  :   Gerd CORNILS et al.

It is certified that error appears in the above-identified patent and that said Letters Patent is hereby corrected as shown below:

TITLE PAGE [30] Foreign Application Priority Data, change "Oct. 7, 1996" to --Oct. 7, 1995--.

TITLE PAGE, Col. 2, after line 6, insert --5,273,704   12/1993   Scholl et al.--.

TITLE PAGE, Col. 2, FOREIGN PATENT DOCUMENTS
    line 3, change "0 494 824 A1    6/1990   Germany" to
    -- 0 494 824 A1    7/1992   Europe--;

after line 4, insert --620 134 A2 and A3   10/1994   Europe--.

Signed and Sealed this

Eighth Day of December, 1998

Attest:

BRUCE LEHMAN

*Attesting Officer*     *Commissioner of Patents and Trademarks*